(12) United States Patent  (10) Patent No.: US 8,107,761 B2
Chuang                    (45) Date of Patent:  Jan. 31, 2012

(54) METHOD FOR DETERMINING BOUNDARY STRENGTH

(75) Inventor: Eric Chuang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1170 days.

(21) Appl. No.: 11/856,660

(22) Filed: Sep. 17, 2007

(65) Prior Publication Data

US 2009/0034855 A1  Feb. 5, 2009

(30) Foreign Application Priority Data

Aug. 3, 2007  (TW) ............................... 96128734 A

(51) Int. Cl.
*G06K 9/40* (2006.01)
(52) U.S. Cl. ................... 382/268; 382/238; 375/240.12; 375/240.13; 375/240.16; 375/240.24
(58) Field of Classification Search ................... 382/268
See application file for complete search history.

(56) References Cited

U.S. PATENT DOCUMENTS

| | | | | |
|---|---|---|---|---|
| 6,539,060 | B1 * | 3/2003 | Lee et al. | 375/240.29 |
| 7,050,504 | B2 * | 5/2006 | Joch et al. | 375/240.26 |
| 7,457,362 | B2 * | 11/2008 | Sankaran | 375/240.24 |
| 7,738,564 | B2 * | 6/2010 | Park et al. | 375/240.29 |
| 7,778,480 | B2 * | 8/2010 | Huang et al. | 382/268 |
| 7,911,538 | B2 * | 3/2011 | Ha et al. | 348/607 |
| 7,929,610 | B2 * | 4/2011 | Sun | 375/240.16 |
| 2003/0202608 | A1 * | 10/2003 | MacInnis et al. | 375/240.29 |
| 2003/0219073 | A1 * | 11/2003 | Lee et al. | 375/240.27 |
| 2004/0071217 | A1 * | 4/2004 | Lin | 375/240.25 |
| 2004/0091048 | A1 * | 5/2004 | Youn | 375/240.16 |
| 2004/0101059 | A1 * | 5/2004 | Joch et al. | 375/240.29 |
| 2004/0184549 | A1 * | 9/2004 | Webb | 375/240.29 |
| 2005/0013494 | A1 * | 1/2005 | Srinivasan et al. | 382/233 |
| 2005/0117653 | A1 * | 6/2005 | Sankaran | 375/240.24 |
| 2005/0201633 | A1 * | 9/2005 | Moon et al. | 382/268 |
| 2005/0207492 | A1 * | 9/2005 | Pao | 375/240.16 |
| 2005/0244063 | A1 * | 11/2005 | Kwon et al. | 382/233 |
| 2005/0276323 | A1 * | 12/2005 | Martemyanov et al. | 375/240.03 |
| 2005/0276505 | A1 * | 12/2005 | Raveendran | 382/268 |
| 2006/0002476 | A1 * | 1/2006 | Park et al. | 375/240.24 |
| 2006/0029135 | A1 * | 2/2006 | Zhou et al. | 375/240.12 |
| 2006/0062311 | A1 * | 3/2006 | Sun et al. | 375/240.24 |
| 2006/0078048 | A1 * | 4/2006 | Bjontegaard | 375/240.03 |
| 2006/0078052 | A1 * | 4/2006 | Dang | 375/240.24 |

(Continued)

OTHER PUBLICATIONS

List, P. et al., "Adaptive Deblocking Filter", Jul. 2003, IEEE Transactions on Circuits and Systems for Video Technology, vol. 13 Issue:7 , pp. 614-619.*

(Continued)

*Primary Examiner* — Jason M Repko
*Assistant Examiner* — Gandhi Thirugnanam
(74) *Attorney, Agent, or Firm* — Squire, Sanders & Dempsey (US) LLP

(57) ABSTRACT

A method for determining the boundary strengths of edges in a block-based digitally encoded image is disclosed. The method includes setting the boundary strength of two adjacent blocks in an Inter macroblock to a first strength value if any one of the two adjacent blocks contains non-zero prediction residual in the encoding data and setting the boundary strength thereof to a second strength value if the two adjacent blocks are located in the same motion compensation block. An edge with boundary strength equal to the second strength value will be skipped in a deblocking process.

11 Claims, 7 Drawing Sheets

U.S. PATENT DOCUMENTS

| | | | | |
|---|---|---|---|---|
| 2006/0104357 | A1* | 5/2006 | Burazerovic et al. | 375/240.15 |
| 2006/0110056 | A1* | 5/2006 | Gambhire | 382/233 |
| 2006/0126962 | A1* | 6/2006 | Sun | 382/268 |
| 2006/0133504 | A1* | 6/2006 | Jung et al. | 375/240.16 |
| 2006/0146941 | A1* | 7/2006 | Cha et al. | 375/240.29 |
| 2006/0203917 | A1* | 9/2006 | Uchida et al. | 375/240.24 |
| 2006/0227869 | A1* | 10/2006 | Joch et al. | 375/240.03 |
| 2006/0268985 | A1* | 11/2006 | Liang et al. | 375/240.16 |
| 2006/0268988 | A1* | 11/2006 | Sun et al. | 375/240.16 |
| 2007/0058726 | A1* | 3/2007 | Ha et al. | 375/240.24 |
| 2007/0189396 | A1* | 8/2007 | Kitahara et al. | 375/240.26 |
| 2007/0189735 | A1* | 8/2007 | Kawashima et al. | 386/112 |
| 2007/0195888 | A1* | 8/2007 | Sabeti | 375/240.24 |
| 2007/0206871 | A1* | 9/2007 | Jalil et al. | 382/233 |
| 2007/0237241 | A1* | 10/2007 | Ha et al. | 375/240.27 |
| 2008/0123750 | A1* | 5/2008 | Bronstein et al. | 375/240.24 |
| 2008/0144722 | A1* | 6/2008 | Park et al. | 375/240.25 |
| 2008/0240252 | A1* | 10/2008 | He | 375/240.24 |
| 2010/0135399 | A1* | 6/2010 | Rui | 375/240.16 |
| 2010/0183068 | A1* | 7/2010 | Pandit et al. | 375/240.02 |
| 2010/0208805 | A1* | 8/2010 | Yu et al. | 375/240.12 |
| 2010/0208806 | A1* | 8/2010 | Yu et al. | 375/240.12 |

OTHER PUBLICATIONS

Shih, Shen-Yu et al., "A near optimal deblocking filter for H.264 advanced video coding",2006, Proceeding ASP-DAC '06 Proceedings of the 2006 Asia and South Pacific Design Automation Conference, p. 170-175.*

Chen, Cheng-Yi, "A near optimal deblocking filter for H.264 advanced video coding for Video Signals", 2003, Thesis for Master of Science Degree, Department of Electrical Engineering, National Cheng Kung University, p. 1-71.*

Joint Video Team, "Joint Video Team(JVT) of ISO/IECMPEG and ITU-T VCEG—Working Draft No. 2, Revision 2 (WD-2)", Mar. 15, 2002, Document JVT-B118r2, p. 1-106.*

Zhoa, S. et al. "VLSI design for de-blocking filter of H.264 decoder," Oct. 2007, 7th International Conference on ASIC, p. 786-789.*

Iain E. G. Richardson, H.264 and MPEG-4 Video Compression, 2003, ISBN 0-470-84837-5, pp. 170-185.

* cited by examiner

METHOD FOR DETERMINING BOUNDARY STRENGTH

BACKGROUND OF THE INVENTION

1. Field of the Invention

The present invention generally relates to a digital image processing technology, and more particularly to a method for determining the boundary strength (or boundary filter strength) of edges in a block-based digital encoding image.

2. Description of the Prior Art

A block-based digital image encoding technology typically divides an image frame into many macroblocks (MBs) which are then encoded according to the luminance and chroma data of pixels (picture elements) thereof. For example, in the H.264 coding standard, a macroblock represents an image area containing 16×16 pixels. A macroblock can be encoded in Intra Prediction mode or Inter prediction mode. Intra Prediction is formed based on previously encoded and reconstructed blocks in the same video frame, while Inter Prediction creates a prediction model from one or more previously encoded video frames. Usually, a macroblock tends to be encoded in Inter prediction mode when it is correlated with content of another video frame(s).

Among available Inter prediction encoding techniques, motion compensation no doubt plays an important role. The motion compensation technology creates motion compensation blocks based on previously encoded picture(s), and represents the displacement or shift relative to block(s) of the previously encoded pictures with motion vector(s). The picture used to predict or create the motion compensation block is usually called the reference picture. In addition to motion vectors, encoding data may also include the difference between the reference picture block and the motion compensation block, which is referred to as the prediction residual. In the encoding technology such as H.264, the motion vector accuracy can be down to quarter pixel level.

In an encoding technology such as H.264, the motion compensation block mentioned above can be areas with block sizes of 16×16, 8×16, 16×8 or 8×8 pixels in a macroblock as shown in FIG. 9A. These areas are called partitions. For example, if a macroblock is divided into four 8×8 areas, then the macroblock will include four divided areas from D0 to D3 as shown in FIG. 9A. When the partition is the 8×8 mode, it can be further divided into areas with block sizes of 8×8, 4×8, 8×4, or 4×4 pixels as shown in FIG. 9B. These areas are called sub-partitions. The motion compensation block may also be a sub-partition. Such mechanism in which a macroblock may be further partitioned into motion compensation blocks of variant sizes is known as the tree structured motion compensation. Every motion compensation block may be encoded with one or two motion vectors. When a motion compensation block is encoded with two motion vectors, these two motion vectors can reference the same or different reference pictures. In the encoding technology using a partition or a sub-partition as a motion compensation prediction unit, such as H.264, the blocks located in the same partition (or sub-partition) will lie in the same motion compensation block and contain the same motion vector(s).

In order to improve the encoding efficiency of dynamic areas and static areas in a motion picture, the coding standard such as H.264 may encode each vertically adjacent macroblock pair in either frame mode or field mode. This special coding mechanism is generally called the macroblock adaptive frame/field coding which is hereinafter referred to as "MBAFF" for short. Macroblocks encoded in frame mode and field mode are respectively referred to as the Frame MBs and the Field MBs in the following description. When two adjacent macroblocks (may belong to different macroblock pairs) are either both Frame MBs or both Field MBs, they are referred to as having the same parity; otherwise (i.e., one of them is a Frame MB, but the other is a Field MB), they are referred to as having different parities.

The decoding operations in the block-based digital image encoding/decoding system mainly include the inverse quantization and the inverse cosine transformation. The inverse quantization may not completely recover the original image data value, especially for data located in the edge between blocks used as units of the cosine transformation. This problem is called the block effect. The block effect usually causes visual defects on the decoded image, and thus the encoding module and decoding module of the coding technologies such as H.264 may include the function of deblocking process to alleviate or reduce the block effect. FIG. 1 shows a block-based digital image encoder or decoder 100 containing a deblocking module 120 which receives the image data output V of the decoding unit 110, performs deblocking process on the image data V, and then outputs the outcome D(V) after deblocking process to the frame buffer 130. The digital image encoder or decoder 100 generally includes other modules which are not shown in FIG. 1 to simplify the drawing.

The main operations of a conventional deblocking module may be shown by the flow chart of FIG. 2. It includes determining all the edges which need to be deblocked in the image frame (Step 22), determining the boundary strengths of all edges (Step 24), and performing the deblocking process in the image frame based on the boundary strengths (Step 26). Here the edges mean the boundary which locate in the top, bottom, left or right side of a block unit, which may be located inside a macroblock or inside an image frame. In the encoding and decoding technologies such as H.264, the boundary strength can be a value between 0 and 4. The deblocking module skips the deblocking process for any edge with boundary strength 0. The larger the boundary strength is, the stronger the deblocking process will be applied to the pixel data adjacent to the corresponding boundary. For example, the deblocking strength for an edge with boundary strength 4 is generally larger than that for an edge with boundary strength 3, 2, or 1. The deblocking process typically changes the pixel value (either luminance or chroma) lying in both sides of an edge (left and right sides or top and bottom sides), so as to make the difference smaller and accordingly reduce the artificial defects. The larger the boundary strength of an edge is, the stronger the deblocking process therefor is, and the larger the change of values of the pixels lying in both sides of the edge will be.

From above description, when a block-based digitally encoded image is processed with the encoding technology such as H.264, every video frame needs to determine all the boundary strengths efficiently to benefit the proceeding of the entire deblocking process. So there is a need to provide an efficient boundary strength determining method to improve the total performance of the deblocking process as well as the encoding/decoding operations.

SUMMARY OF THE INVENTION

One aspect of the present invention is to provide a method which can efficiently determine the boundary strength of edges in a block-based digitally encoding image so as to improve the entire performance of the deblocking process.

Another aspect of the present invention is to provide a method for determining the boundary strength of edges in a block-based digitally encoding image based on a macroblock. It can determine the boundary strength of edges of the digital image efficiently.

According to one embodiment of the present invention, the present invention provides a method for determining the boundary strength of edges in a block-based digitally encoding image, the method including determining the boundary strength of left edges, top edges, and internal edges of a macroblock according to the encoding mode and other encoding data of the macroblock, in which the encoding mode is Intra Prediction or Intra Prediction and the deblocking process for the block-based digitally encoding image applies operations with different strengths to edges with different boundary strengths.

The method for determining the boundary strength of edges in a block-based digitally encoding image of the present invention may further includes: setting the boundary strength of two adjacent blocks to a first strength value if any block of the two adjacent blocks contains a non-zero prediction residual in the encoding data; and setting the boundary strength thereof to a second strength value if the two adjacent blocks are located in the same motion compensation block, in which the two adjacent blocks are located in the same macroblock in the block-based digitally encoding image, and the macroblock is encoded in inter prediction mode.

DETAILED DESCRIPTION OF THE INVENTION

In the context of this specification, the boundary strength refers to the strength of the edge between two adjacent blocks (left and right or top and bottom). The boundary strength of the edge between two adjacent blocks may be alternatively referred to as the boundary strength of the two adjacent blocks hereinafter. Furthermore, it should be understood that only steps essential to the present invention will be detailed below.

For example, the typical steps for reading the decoded image data (e.g. output from the decoding unit 110) from system memory and/or writing result boundary strength values back to specific locations in memory, although not explicitly described below, may be generally part of the disclosed method.

Figure 1:
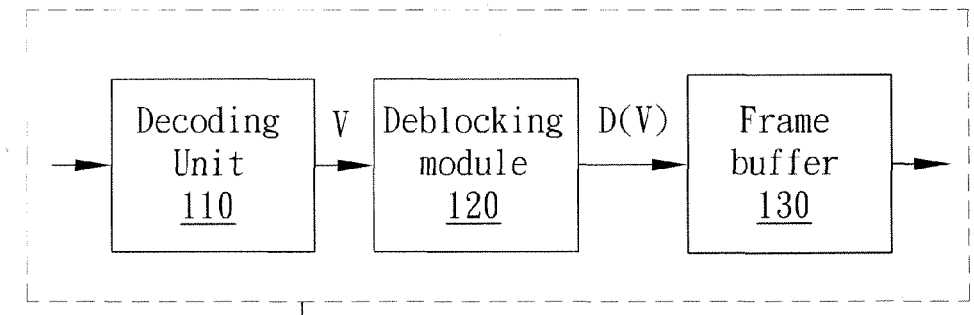
FIG. 1 shows a block-based digital image encoder or decoder containing a deblocking module.
Figure 3A:
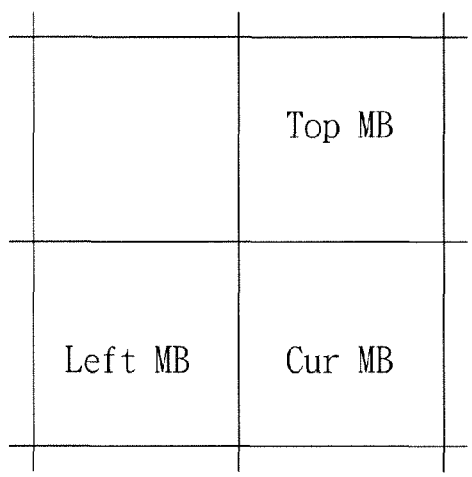
FIG. 3A shows the spatial relationship between a macroblock and its adjacent macroblocks.
Figure 2:
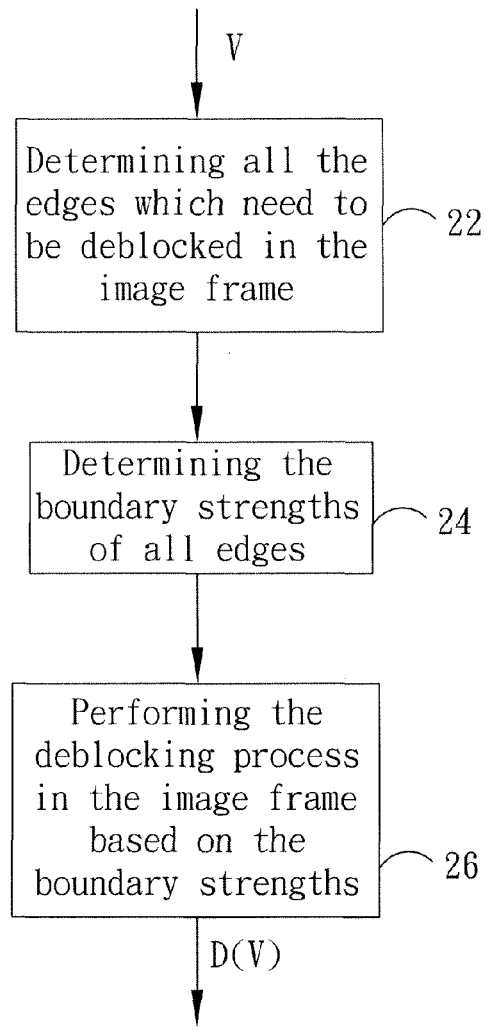
FIG. 2 shows the main operations of a conventional deblocking module.
Figure 3B:
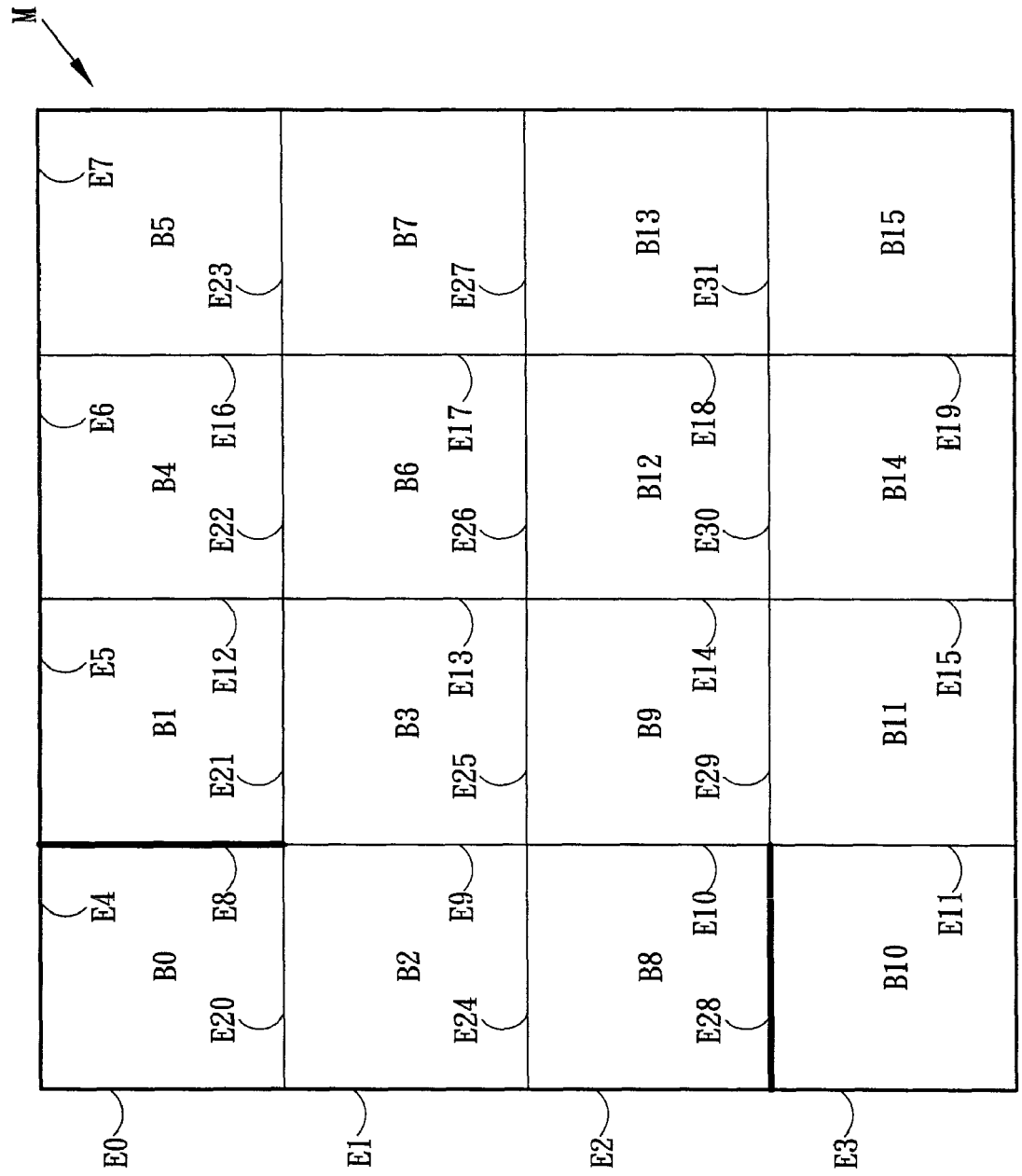
FIG. 3B shows the locations of left edges, top edges, and internal edges of a macroblock.

FIG. 3A shows the spatial relationship between a macroblock Cur MB and it adjacent macroblocks. In the following description, the macroblock which is exactly above the macroblock Cur MB is generally called the Top MB of Cur MB, and the one which is to the left of the macroblock Cur MB is generally called the Left MB of Cur MB. FIG. 3B shows the locations of left edges E0-E3, top edges E4-E7, and internal edges E8-E31 of a macroblock M. The macroblock M can be divided into 16 4×4 blocks B0-B15. For example, the edge between block B0 and block B1 is the internal edge E8, and the edge between block B8 and block B10 is the internal edge E28.

Figure 4:
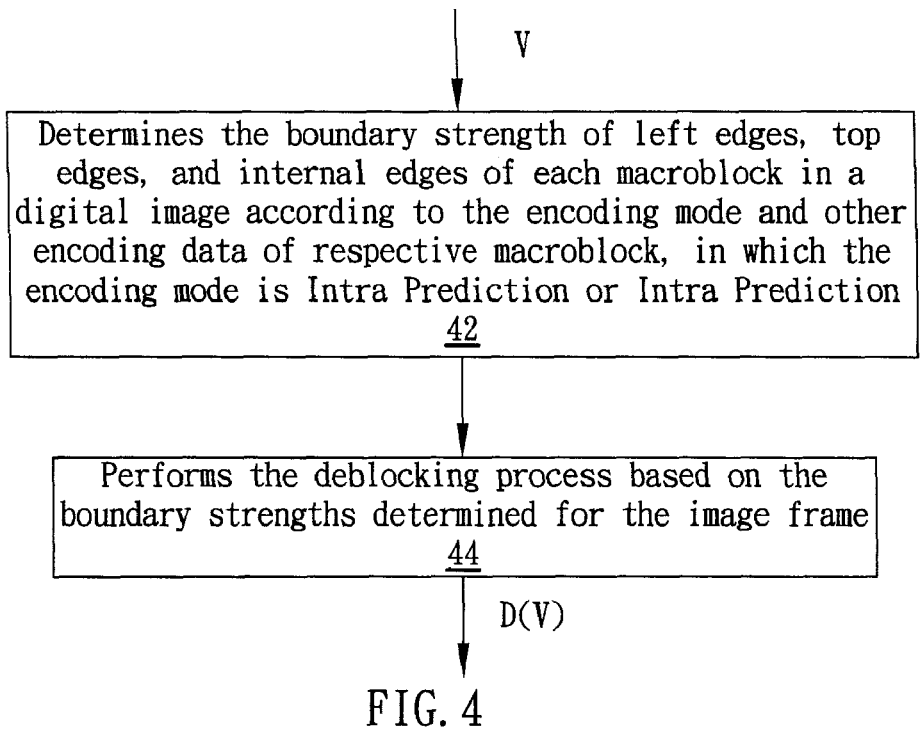
FIG. 4 shows the main flows of the digital image deblocking process according to the present invention.

In contrast with the conventional boundary strength determining method based on edges, the method according to the present invention is based on macroblocks. It can rapidly determine boundary strengths of various edges in a block-based digitally encoding image. For each macroblock, the present invention first determines its encoding mode (Intra Prediction or Inter Prediction), and then determines all boundary strengths of left edges, top edges, and internal edges of the macroblock according to other encoding data. From embodiments illustrated below, it will be realized that the "other encoding data" may include the prediction residuals, numbers and contents of motion vectors, motion compensation blocks and reference pictures. Referring to FIG. 4, which shows the main flows of the digital image deblocking method according to the present invention. The deblocking method includes the method for determining boundary strength according to one embodiment of the present invention. The digital image deblocking method shown in FIG. 4 includes steps 42 and 44. Step 42 determines the boundary strength of left edges, top edges, and internal edges of each macroblock in a digital image frame according to the encoding mode and other encoding data of respective macroblock, in which the encoding mode is either Intra Prediction or Intra Prediction; and step 44 performs the deblocking process based on the boundary strengths determined for the image frame.

In the following description, a macroblock encoded in intra prediction mode is called an Intra MB, and a macroblock encoded in inter prediction mode is called an Inter MB. The method for determining the boundary strengths of left edges, top edges, and internal edges of Intra MB and Inter MB according to the present invention will be detailed below.

Figure 5:
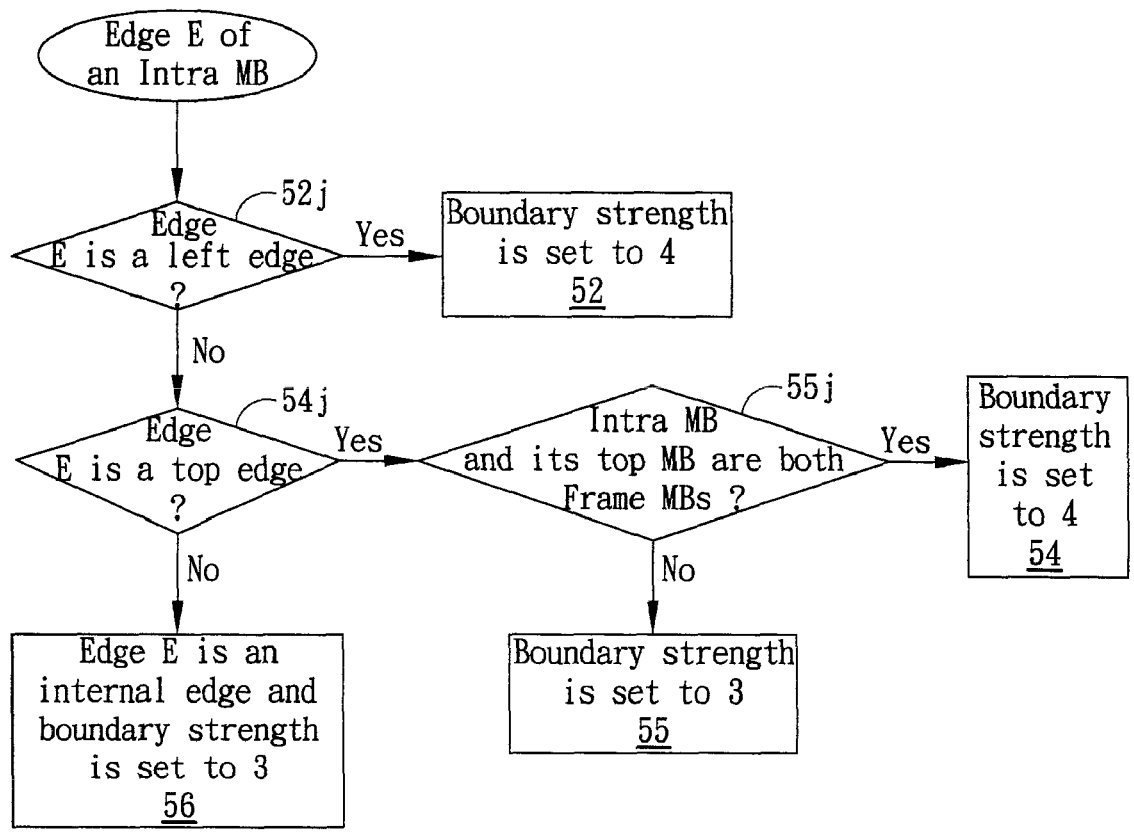
FIG. 5 shows the method for determining the boundary strength of left edges, top edges and internal edges of an Intra MB according to an embodiment of the present invention.

FIG. 5 shows the method for determining the boundary strengths of left edges, top edges and internal edges of an Intra MB according to one embodiment of the present invention. For each edge E of the Intra MB, if the edge E is a left edge, i.e. an edge lying between Intra MB and its Left MB, then the boundary strength of edge E is assigned to 4 (step 52j, step 52). If the edge E is a top edge, i.e. an edge lying between Intra MB and its Top MB, and Intra MB and its top MB are both Frame MBs (that is, macroblocks encoded in MBAFF frame mode), then the boundary strength of edge E is set to 4 (steps 54j, 55j, 54); otherwise, the boundary strength of edge E is set 3 (step 54j, 55j, 55). If the edge E is an internal edge, then its boundary strength is set to 3 (step 56). As described above, the larger the boundary strength is, the stronger the deblocking process will be applied to the pixel data adjacent to the corresponding boundary. In other words, the deblocking process may apply the strongest deblocking operation to the left edges and the top edges of an Intra MB.

Figure 6A:
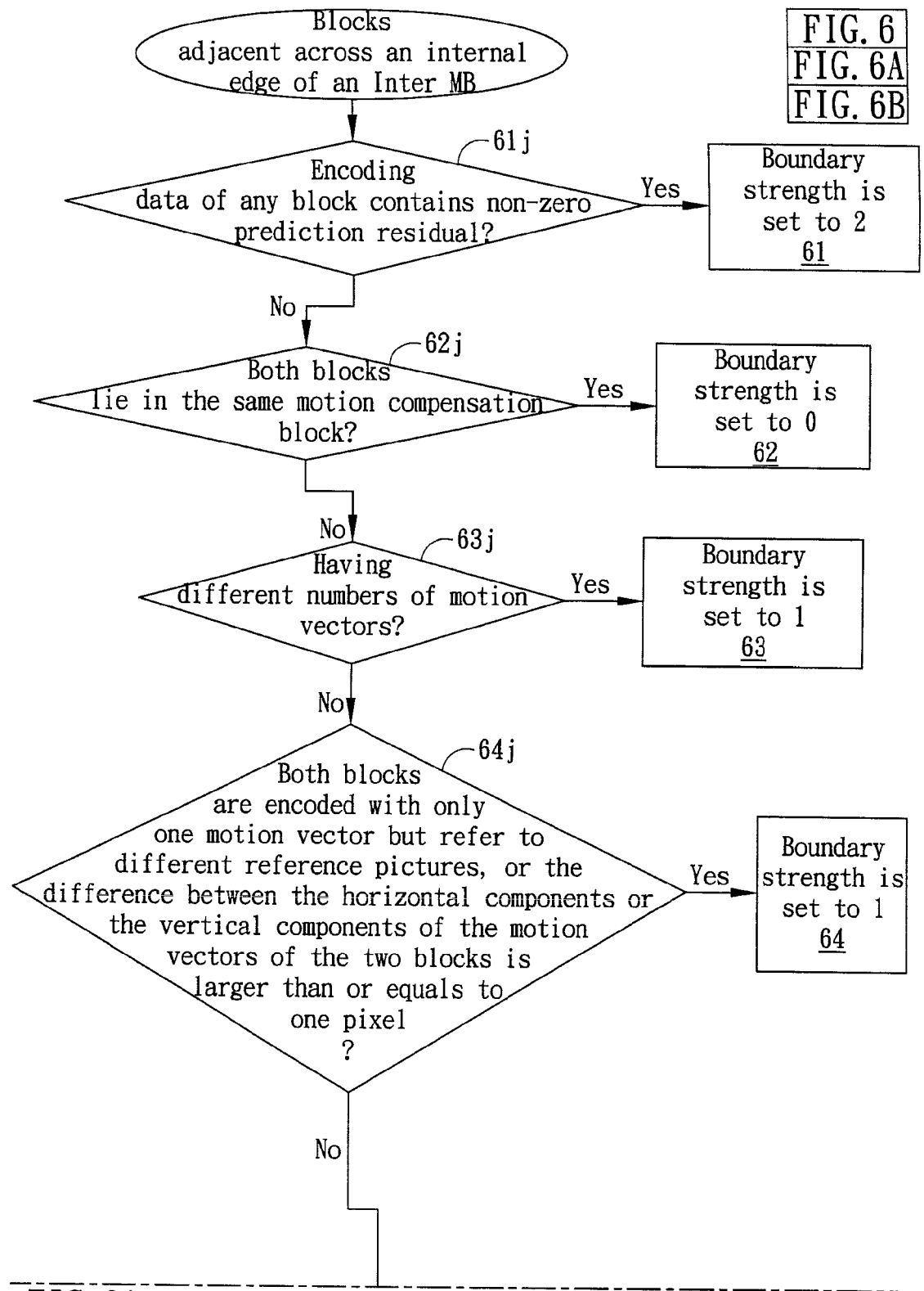
FIGS. 6A and 6B show the flow chart of the method for determining boundary strength of an internal edge of an Inter MB according to an embodiment of the present invention.
Figure 6B:
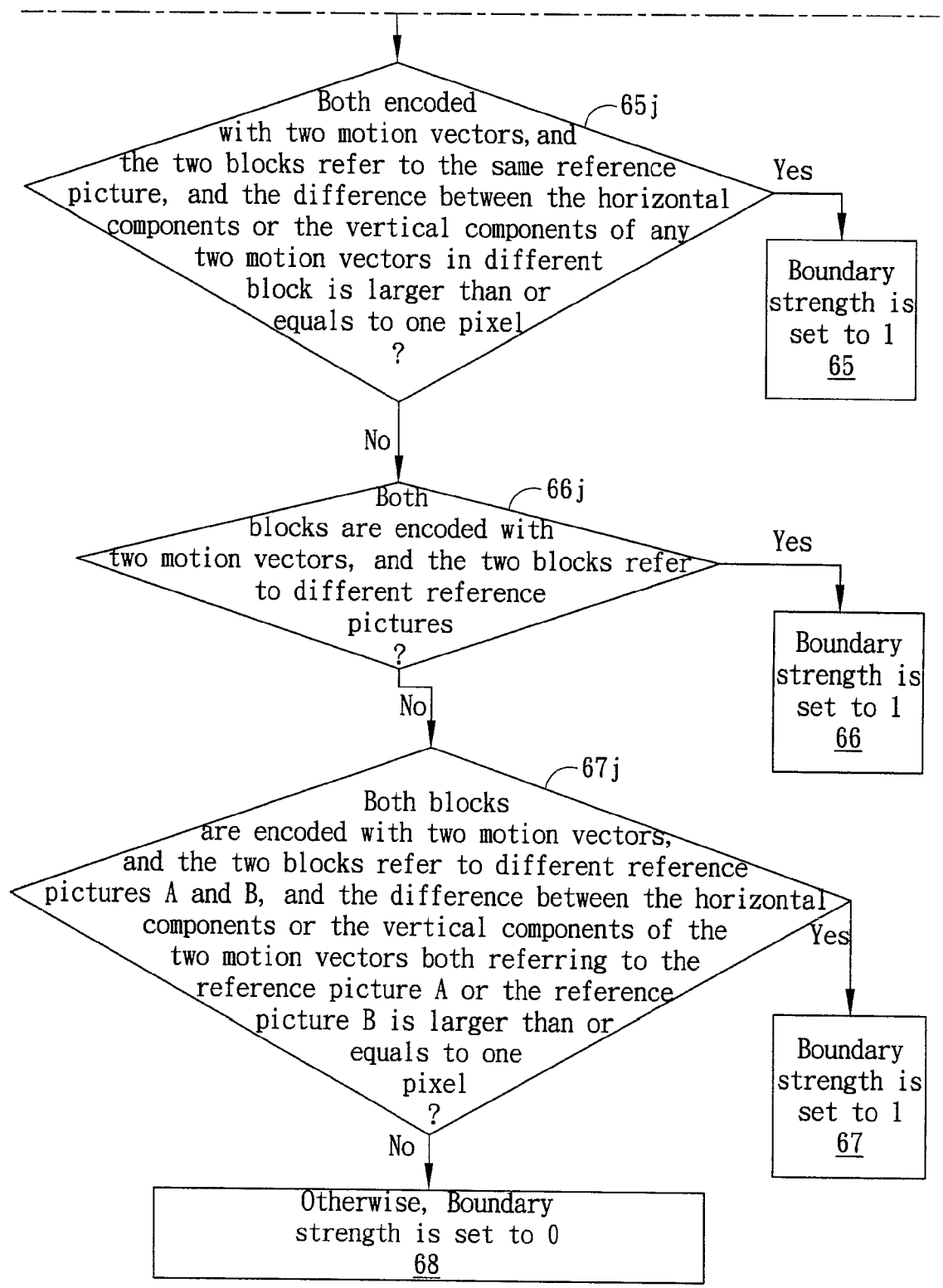

FIGS. 6A and 6B collectively show the flow chart of the method for determining the boundary strength of an internal edge E of an Inter MB according to one embodiment of the present invention. For each internal edge E of the Inter MB, if the encoding data of any one of the blocks adjacent across the internal edge E contains non-zero prediction residual, then its boundary strength is assigned to 2 (step 61j, step 61). If the two blocks adjacent across the internal edge E both lie in the same motion compensation block, then the boundary strength of edge E is set to 0 (step 62j, step 62). If the two blocks adjacent across the internal edge E have different number of motion vectors, then the boundary strength of edge E is set to 1 (step 63j, step 63). If the two blocks adjacent across the internal edge E are both encoded with only one motion vector but refer to different reference pictures, or the difference between the horizontal components or the vertical components of the motion vectors of the two blocks is larger than or equals to one pixel, then the boundary strength of edge E is set to 1 (step 64j, step 64). If the two blocks adjacent across the internal edge E are both encoded with two motion vectors, and the two blocks refer to the same reference picture, which means the four motion vectors all refer to the same reference picture, and if the difference between the horizontal components or the vertical components of any two motion vectors in different block is larger than or equals to one pixel, then the boundary strength of edge E is set to 1 (step 65j, step 65). If the two blocks adjacent across the internal edge E are both encoded with two motion vectors, and the two blocks refer to different reference pictures, then the boundary strength of edge E is set to 1 (step 66j, step 66). If the two blocks adjacent across the internal edge E are both encoded with two motion vectors, and the two blocks refer to different reference pictures A and B, and if the difference between the horizontal components or the vertical components of the two motion vectors both referring to the reference picture A or the reference picture B is larger than or equals to one pixel, then the boundary strength of edge E is set to 1 (step 67j, step 67). In other cases, the boundary strength of the internal edge E is assigned to 0 (step 68).

For the encoding technology with quarter pixel motion vector, such as H.264, the one pixel difference usually means 4. But if the macroblock is a Field MB, the one pixel difference in vertical components means 2.

Figure 6C:
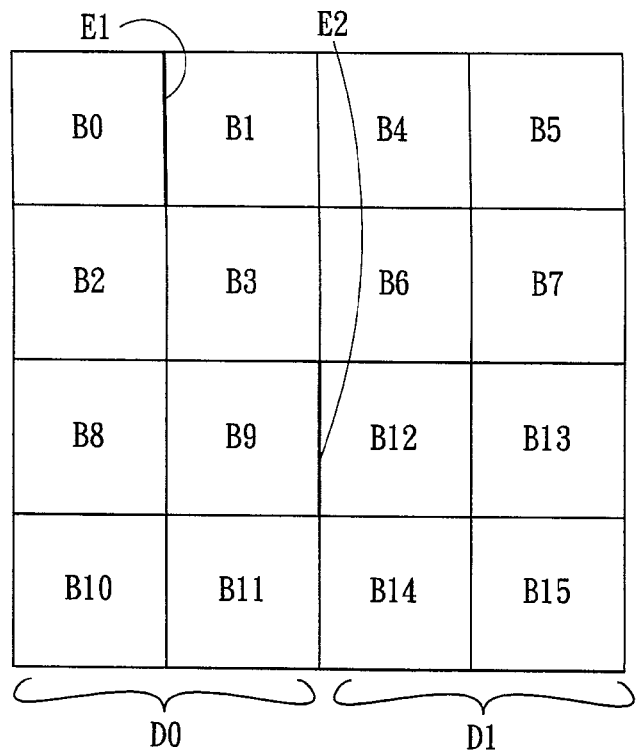
FIG. 6C illustrates the internal edges respectively located between adjacent blocks lying in the same partition or different partitions.
Figure 9A:
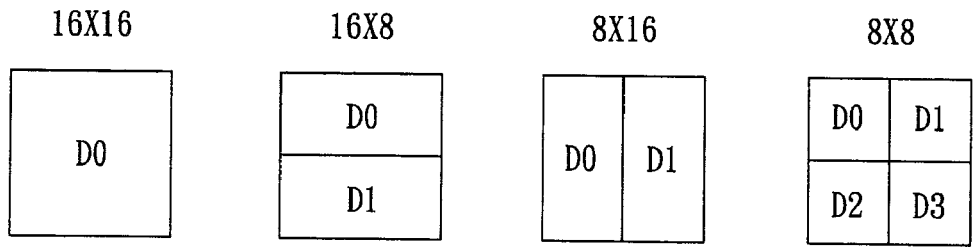
FIG. 9A shows possible ways for a macroblock to be divided into partition(s).
Figure 9B:
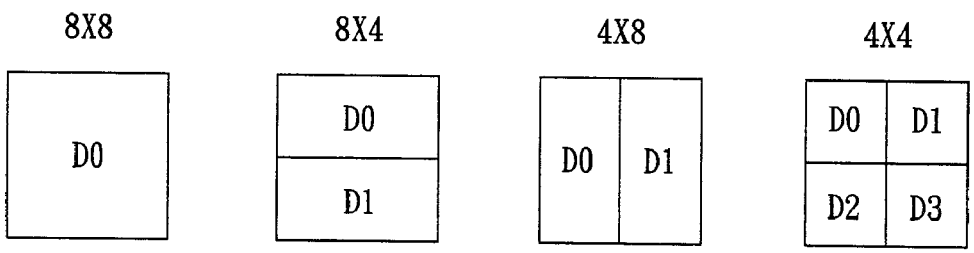
FIG. 9B shows possible ways for an 8×8 partition to be divided into sub-partition(s).

As described above, the blocks lying in the same partition or sub-partition will lie in the same motion compensation block. In step 62j of FIG. 6A, determining whether two blocks adjacent across the internal edge E lie in the same motion compensation block or not may be performed through examining if the two blocks are located in the same partition or sub-partition of a macroblock. FIG. 6C illustrates the internal edges E1 and E2 which are respectively located between adjacent blocks lying in the same partition and different partitions. As shown in FIG. 6C, blocks B0 and B1 adjacent across the internal edge E1 both lie in the partition D0, while blocks B9 and B12 adjacent across the internal edge E2 lie in different partitions D0 and D1 respectively. In this way, it may determine that the two blocks (B0 and B1) adjacent across the internal edge E1 lie in the same motion compensation block (D0), while the two blocks (B9 and B12) adjacent across the internal edge E2 lie in different motion compensation blocks (D0 and D1). From this illustration, those skilled in the art should be able to infer the detail of the determining step (62j) for the other partition or sub-partition mode shown in FIGS. 9A and 9B.

Figure 7:
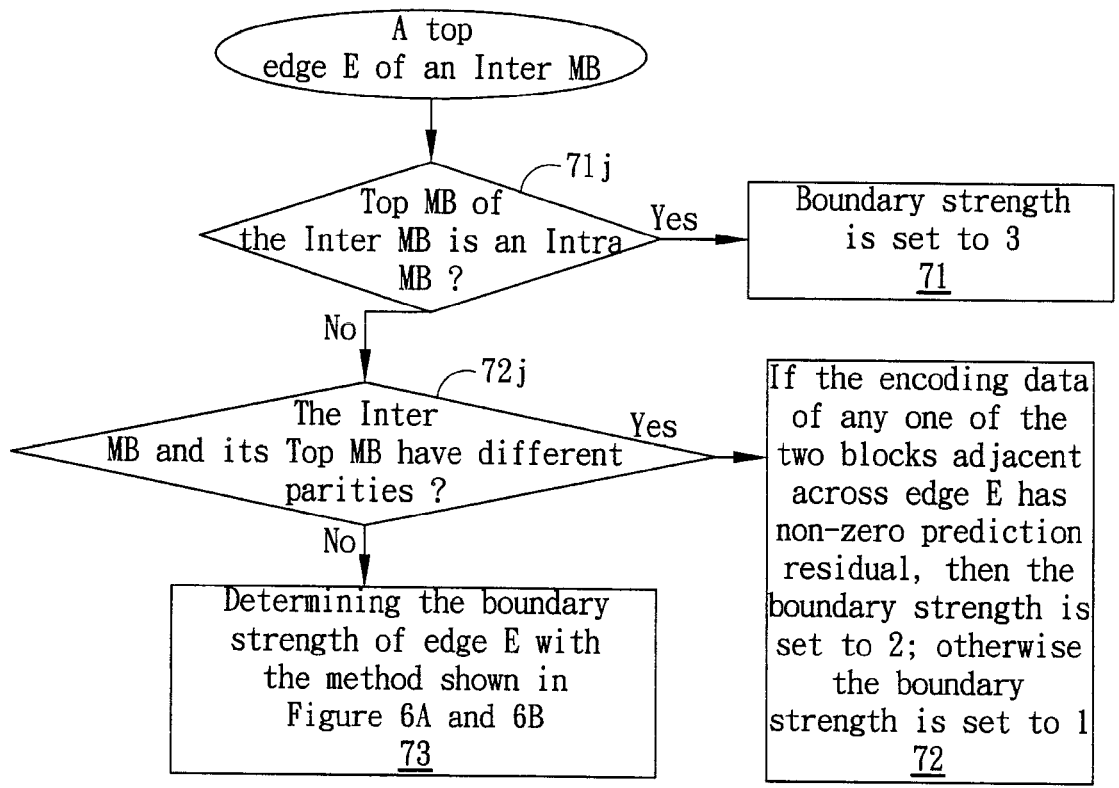
FIG. 7 shows the flow chart of a method for determining the boundary strength of a top edge of an Inter MB according to an embodiment of the present invention.

FIG. 7 shows the flow chart of a method for determining the boundary strength of a top edge of an Inter MB according to one embodiment of the present invention. For each top edge E of the Inter MB, if the Top MB of the Inter MB is an Intra MB, then the boundary strength of the top edge E is set to 3 (step 71j, step 71). If the Inter MB and its Top MB have different parities, and if the encoding data of any one of the two blocks adjacent across the top edge E has non-zero prediction residual, then setting the boundary strength of edge E to 2; otherwise setting the boundary strength of edge E to 1 (step 72j, step 72). If the Inter MB and its Top MB have the same parity, then determining the boundary strength of the top edge E with the method shown in FIGS. 6A and 6B (step 72j, step 73).

Figure 8:
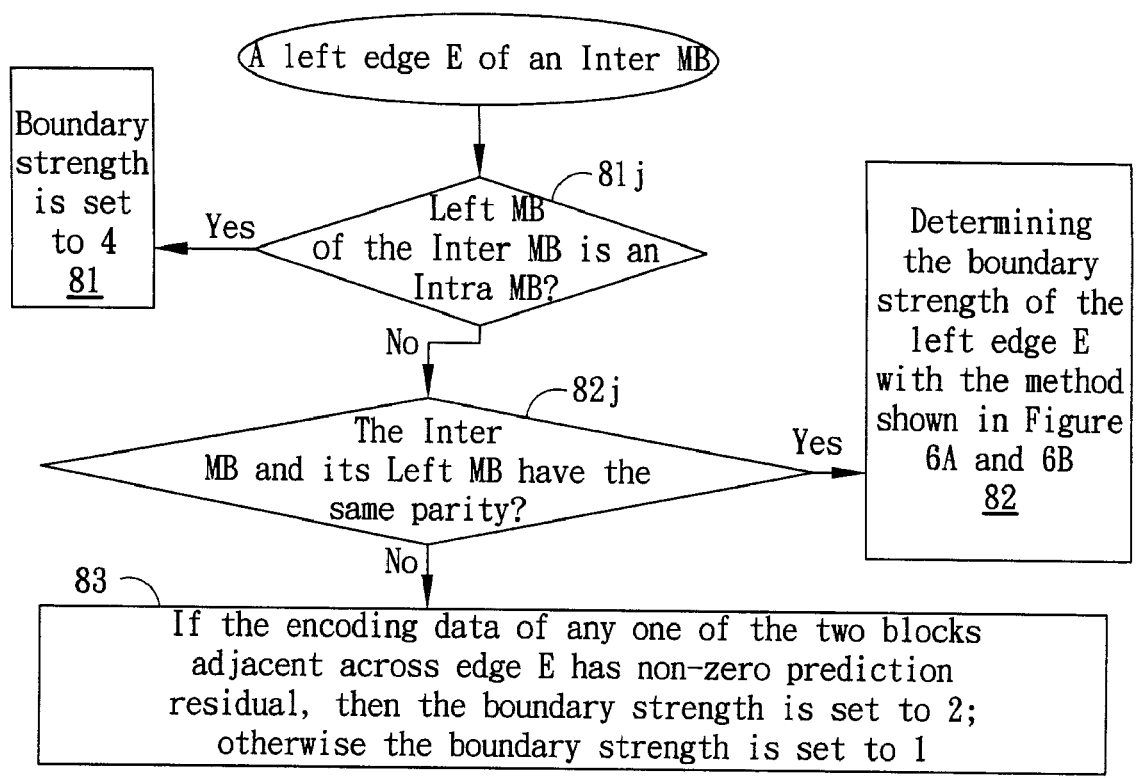
FIG. 8 shows the flow chart of a method for determining the boundary strength of a left edge of an Inter MB according to one embodiment of the present invention.

FIG. 8 shows the flow chart of a method for determining the boundary strength of a left edge of an Inter MB according to one embodiment of the present invention. For each left edge E of the Inter MB, if the Left MB of the Inter MB is an Intra MB, then the boundary strength of the left edge E is set to 4 (step 81j, step 81). If the Inter MB and its Left MB have the same parity, then determining the boundary strength of the left edge E with the method shown in FIGS. 6A and 6B (step 82j, step 82). If the Inter MB and its Left MB have different parities, and if the encoding data of any one of the two blocks adjacent across the left edge E has non-zero prediction residual, then setting the boundary strength of edge E to 2. Otherwise the boundary strength of edge E is set to 1 (step 82j, step 83).

The above examples and description have been provided only for the purpose of illustration, and are not intended to limit the invention in any way. A great variety of variations and modifications may carry out the present invention without exceeding the scope thereof. For example, although above illustrations are based on the encoding protocol of H.264, the application of the present invention should not be limit by this. Moreover, many variations such as the sizes of blocks, macroblocks, partitions and sub-partitions, as well as the accuracy unit of motion vectors, and possible values of the boundary strength (e.g. other than 0-4) may be made without departing from the scope of the present invention, which is intended to be limited solely by the appended claims.

What is claimed is:

1. A method for determining boundary strengths of edges in a block-based digitally encoded image, the method comprising the steps of:

determining boundary strengths of left edges, top edges and internal edges of a macroblock according to encoding mode and encoding data of the macroblock, the encoding mode being either Intra Prediction or Inter Prediction; and applying deblocking operations with different strengths to edges with different boundary strength values by a deblocking process for the block-based digitally encoded image;

wherein if the encoding mode of the macroblock is Inter Prediction, and none of two adjacent blocks in the macroblock has non-zero residuals and the two adjacent blocks both lie in the same motion compensation block, then setting boundary strength of the two adjacent blocks to a first strength value, and if the encoding mode of the macroblock is Intra Prediction, then the boundary strengths of the left edges of the macroblock are set to a second strength value; if both the macroblock and its Top macroblock (MB), which is the macroblock above the current macroblock, are both Frame macroblocks (MBs), which are macroblocks encoded in frame mode, then the boundary strengths of the top edges of the macroblock are set to the second strength value, otherwise the boundary strengths of the top edges of the macroblock are set to a third strength value; and the boundary strengths of the internal edges of the macroblock are all set to the third strength value.

2. The method of claim 1, wherein the deblocking process skips any deblocking operation for any edge with boundary strength equal to the first strength value.

3. The method of claim 2, wherein whether the two adjacent blocks lie in the same motion compensation block or not is determined through examining if the two adjacent blocks are located in the same partition or sub-partition of the macroblock.

4. The method of claim 3, wherein the block is a 4×4 pixel area, and wherein the partition is a pixel area with size of 16×16, 16×8, 8×16 or 8×8 pixels.

5. The method of claim 3, wherein the block is a 4×4 pixel area, and wherein the sub-partition is a pixel area with size of 8×8, 8×4 or 4×8 pixel.

6. The method of claim 3, wherein:
if the two adjacent blocks lie in different motion compensation blocks and have different number of motion vectors, then setting the boundary strength of the two adjacent blocks to a fourth strength value.

7. The method of claim 6, wherein the strength of the deblocking operation applied to an edge with boundary strength equal to the third strength value is stronger than the strength of the deblocking operation applied to an edge with boundary strength equal to the fourth strength value.

8. The method of claim 1, wherein the strength of the deblocking operation applied to an edge with boundary strength equal to the second strength value is stronger than the strength of the deblocking operation applied to an edge with boundary strength equal to the third strength value.

9. A method for determining boundary strengths of edges in a block-based digitally encoded image, the method comprising the steps of:

determining boundary strengths of left edges, top edges and internal edges of a macroblock according to encoding mode and encoding data of the macroblock, the encoding mode being either Intra Prediction or Inter Prediction; and applying deblocking operations with different strengths to edges with different boundary strength values by a deblocking process for the block-based digitally encoded image;

wherein if the encoding mode of the macroblock is Intra Prediction, then the boundary strengths of the left edges of the macroblock are set to a first strength value; if both the macroblock and its Top macroblock (MB), which is the macroblock above the current macroblock, are both Frame macroblocks (MBs), which are macroblocks encoded in frame mode, then the boundary strengths of the top edges of the macroblock are set to the first strength value, otherwise the boundary strengths of the top edges of the macroblock are set to a second strength value; and the boundary strengths of the internal edges of the macroblock are all set to the second strength value.

10. The method of claim 9, wherein the strength of the deblocking operation applied to an edge with boundary strength equal to the first strength value is stronger than the strength of the deblocking operation applied to an edge with boundary strength equal to the second strength value, and the strength of the deblocking operation applied to an edge with boundary strength equal to the second strength value is stronger than the strength of the deblocking operation applied to an edge with boundary strength equal to a third strength value.

11. The method of claim 9, wherein the encoding data comprises prediction residuals, numbers and contents of motion vectors, motion compensation blocks and reference pictures.

\* \* \* \* \*